US011101995B1

(12) United States Patent
Oliver et al.

(10) Patent No.: US 11,101,995 B1
(45) Date of Patent: Aug. 24, 2021

(54) SECURE VIDEO CONTENT TRANSMISSION OVER A COMPUTER NETWORK (71) Applicant: Trend Micro Incorporated, Tokyo (JP)

(72) Inventors: Jonathan James Oliver, Melbourne (AU); Chia-Yen Chang, Taipei (TW); Wen-Kwang Tsao, Taipei (TW); Ping Huan Wu, Taipei (TW); Federico Maggi, Vimercate (IT); Jiri Gogela, Prague (CZ); Fyodor Yarochkin, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 352 days.

(21) Appl. No.: 16/294,273

(22) Filed: Mar. 6, 2019

(51) Int. Cl.
*H04L 29/06* (2006.01)
*H04L 9/08* (2006.01)
*H04N 21/84* (2011.01)
*G06F 16/787* (2019.01)
*G06F 16/783* (2019.01)
*H04W 12/63* (2021.01)
*H04W 12/71* (2021.01)

(52) U.S. Cl.
CPC .......... *H04L 9/0872* (2013.01); *G06F 16/787* (2019.01); *G06F 16/7837* (2019.01); *H04L 63/06* (2013.01); *H04L 63/107* (2013.01); *H04N 21/84* (2013.01); *H04W 12/63* (2021.01); *H04W 12/71* (2021.01)

(58) Field of Classification Search
CPC ..... H04L 9/0872; H04L 63/06; H04L 63/107; G06F 16/7837; G06F 16/787; H04W 12/63; H04W 12/71; H04N 21/84
See application file for complete search history.

(56) References Cited

U.S. PATENT DOCUMENTS

| 9,870,508 B1 | 1/2018 | Hodgson et al. | |
|---|---|---|---|
| 2006/0115111 A1* | 6/2006 | Malone | H04L 9/302 382/100 |
| 2016/0283920 A1 | 9/2016 | Fisher et al. | |
| 2018/0121635 A1 | 5/2018 | Tormasov et al. | |
| 2019/0354694 A1* | 11/2019 | Azoulay | G06F 21/64 |

OTHER PUBLICATIONS

Email—Wikipedia, 19 sheets [retrieved on Mar. 19, 2018], retrieved from the internet: https://en.wikipedia.org/wiki/Email.

(Continued)

*Primary Examiner* — Olugbenga O Idowu
(74) *Attorney, Agent, or Firm* — Okamoto & Benedicto LLP (57) ABSTRACT

A computer network includes a camera node, a network access node, a verification node, and a display node. Video content recorded by a camera at the camera node is transmitted to the display node and to the verification node for verification. The video content is verified at the display node and at the verification node. Recording metadata of the video content is stored in a distributed ledger and retrieved by the display node to verify the video content. The verification node receives, from the network access node, verification data for verifying the video content.

14 Claims, 10 Drawing Sheets

(56) References Cited

OTHER PUBLICATIONS

Domain Keys Identified Mail (DKIM)—Wikipedia, 9 sheets [retrieved on Mar. 19, 2018], retrieved from the internet: https://en.wikipedia.org/wiki/DomainKeys_Identified_Mail.

Rong Zheng, et al. "A Framework for Authorship Identification of Online Messages: Writing-Style Features and Classification Techniques", Feb. 1, 2006, pp. 378-393, retrieved from the internet: http://www.pages.drexel.edu/~jl622/docs/Jounals/Zheng_2006JASIST_AuthorshipIdentification.pdf.

Characterizing Authorship Style Using Linguistic Features, 5 sheets [retrieved on Mar. 19, 2018], retrieved from the internet: http://www.dh2012.uni-hamburg.de/conference/programme/abstracts/characterizing-authorship-style-using-linguistic-features.1.html.

Email agent (infrastructure)—Wikipedia, 2 sheets [retrieved on Mar. 19, 2018], retrieved from the internet: https://en.wikipedia.org/wiki/Email_agent_(infrastructure).

FBI Public Service Announcement, 6 sheets [retrieved on Mar. 19, 2018], retrieved from the internet: https://www.ic3.gov/media/2017/170504.aspx.

Analyzing stylistic similarity amongst authors, 13 sheets [retrieved on Mar. 19, 2018], retrieved from the internet: http://markallenthornton.com/blog/stylistic-similarity/.

Targeted Attacks—Definition—Trend Micro USA, 5 sheets [retrieved on Mar. 19, 2018], retrieved from the internet: https://www.trendmicro.com/vinfo/us/security/definition/targeted-attacks.

Context awareness—Wikipedia, 7 sheets [retrieved on Mar. 19, 2018] retrieved from the internet: https://en.wikipedia.org/wiki/Context_awareness.

Sender Policy Framework—Wikipedia, 8 sheets [retrieved on Mar. 19, 2018] retrieved from the internet: https://en.wikipedia.org/wiki/Sender_Policy_Framework.

Simplified features for email authorship identification, Aug. 2013, 11 sheets, retrieved from the internet: https://www.researchgate.net/publication/262351747_Simplified_features_for_email_authorship_identification.

Machine learning—Wikipedia, 14 sheets [retrieved on Mar. 28, 2018] retrieved from the internet: https://en.wikipedia.org/wiki//Machine_learning.

Meet Trumpot, the bot that tries to talk like Trump—The Washington Post, 4 sheets [retrieved on Mar. 30, 2018] retrieved from the internet: https://www.washingtonpost.com/news/politics/wp/2018/01/16/meet-trumpbot-the-bot-that-tries-to-talk-like-trump/.

TrumpBot : Seq 2 Seq with Pointer Sentinel Model, 9 sheets [retrieved on Mar. 30, 2018], retrieved from the internet: https://www.semanticscholar.org/paper/TrumpBot-%3A-Seq-2-Seq-with-Pointer-Sentinel-Model-Zivkovic/.

Malcolm Walter Corney "Analysing E-mail Text Authorship for Forensic Purposes", Mar. 2003, 180 sheets, retrieved from the internet: https://eprints.qut.edu.au/16069/1/Malcolm_Corney_Thesis.pdf.

Wikipedia—Physical unclonable function, 7 sheets [retrieved on Nov. 7, 2018], retrieved from the internet: https://en.wikipedia.org/wiki/Physical_unclonable_function.

Chitra Javali, et al. "Poster: Were You in the Cafe Yesterday? Location Proof Generation & Verification for Mobile Users", 2015, pp. 429-430, School of Computer Science & Engineering, UNSW, Sydney, Australia.

Chitra Javali, et al. "I am Alice, I was in Wonderland: Secure Location Proof Generation and Verification Protocol", 2016 IEEE 41st Conference on Local Computer Networks, pp. 477-485, School of Computer Science & Engineering, UNSW, Sydney, Australia.

Justin Cox, et al. "Secret Key Generation on a FPGA using a PUF", 2018, 3 sheets, Department of Electrical and Computer Engineering, Utah State University, Logan, UT.

Md Nazmul Islam, et al. "On IC Traceability via Blockchain", Apr. 2018, 4 sheets, University of Massachusetts Amherst, MA.

* cited by examiner

SECURE VIDEO CONTENT TRANSMISSION OVER A COMPUTER NETWORK

BACKGROUND OF THE INVENTION

1. Field of the Invention

The present invention relates generally to computer security, and more particularly to secure video content transmission.

2. Description of the Background Art

A fake video may be created by digital video editing, use of artificial intelligence, or other means. Fake videos created using artificial intelligence, which are also called "deepfakes", are especially difficult to detect. Examples of fake videos released on the Internet include phony speeches of head of states, pornographic materials that have been altered to include famous people, etc. With the advent of readily-available fake video software, such as the FakeApp software, proliferation of fake videos is to be expected. Worse, it is becoming increasingly difficult to distinguish fake videos from real ones.

SUMMARY

In one embodiment, a computer network includes a camera node, a network access node, a verification node, and a display node. Video content recorded by a camera at the camera node is transmitted to the display node and to the verification node for verification. The video content is verified at the display node and/or at the verification node. Recording metadata of the video content is stored in a distributed ledger and retrieved by the display node to verify the video content. The verification node receives, from the network access node, verification data for verifying the video content.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Fake videos may be employed in a business video compromise (BVC) attack, which may be perpetrated by a cybercriminal over a computer network. An example BVC attack may involve using a fake video of a high-ranking person of an organization to trick the organization to transfer money, provide confidential information, or perform other actions for the cybercriminal. As another example, the cybercriminal may use fake video as "proof" in a legal proceeding or in transactions that require video for authentication (e.g., to open a bank account).

Figure 1:
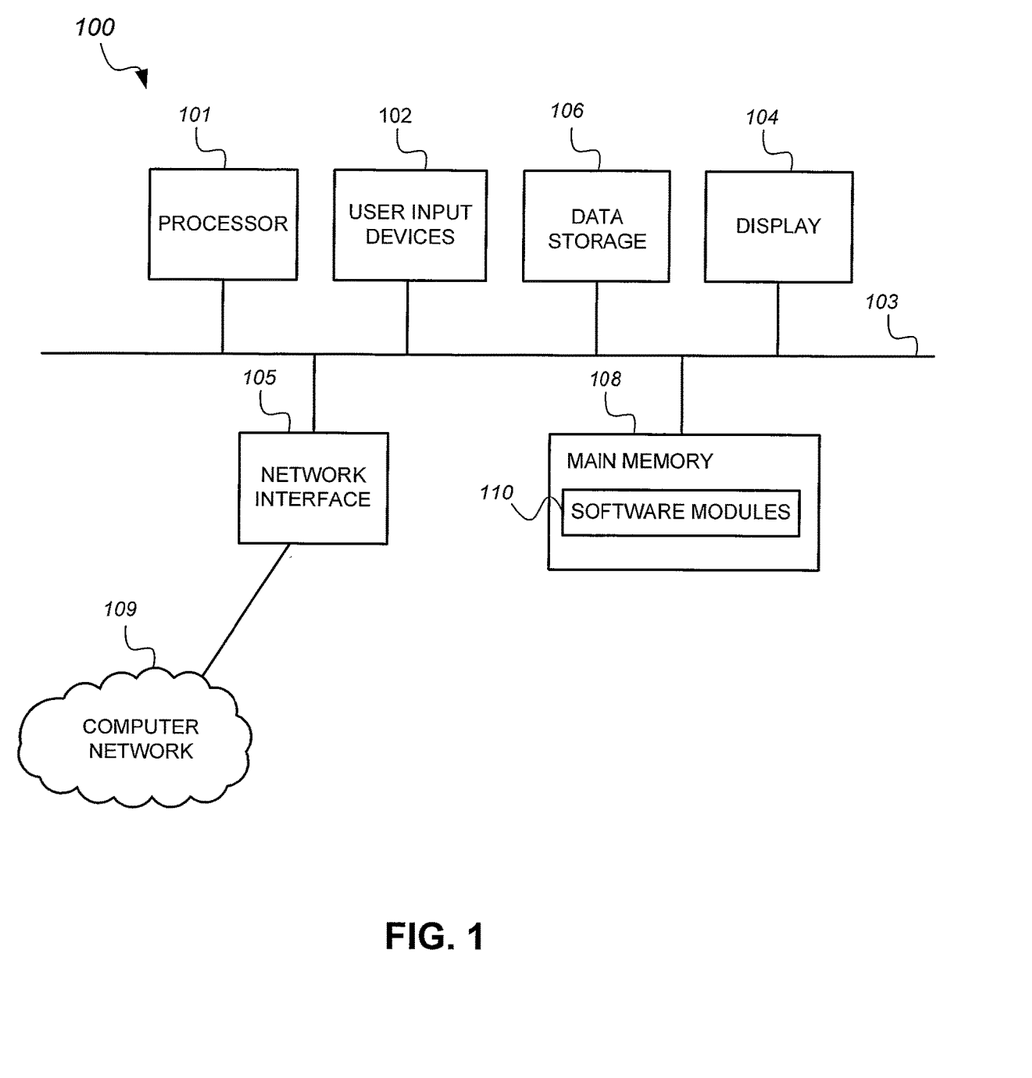
FIG. 1 is a logical diagram of a computer system that may be employed with embodiments of the present invention.

FIG. 1 is a logical diagram of a computer system 100 that may be employed with embodiments of the present invention. The computer system 100 may be employed as a camera node, a network access node, a display node, a verification node, or other computer described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem, radio), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In the example of FIG. 1, the software modules 110 may comprise those of a camera node, a network access node, verification node, or display node. For example, the software modules 110 may comprise instructions for controlling the operation of a video camera when the computer system 100 is configured as a computer of a camera node as described below. Yet another example, the software modules 110 may comprise instructions for controlling the operation of a network access device when the computer system 100 is configured as the network device of a network access node. Yet another example, the software modules 110 may comprise instructions for verifying video content when the computer system 100 is configured as a computer of a display node or a computer of a verification node.

As can be appreciated, the one or more functionalities of the software modules 110 may also be implemented in hardware (e.g., application-specific integrated circuit, field-programmable gate array, programmable logic device) or a combination of hardware and software depending on the needs of a particular computer security application.

Figure 2:
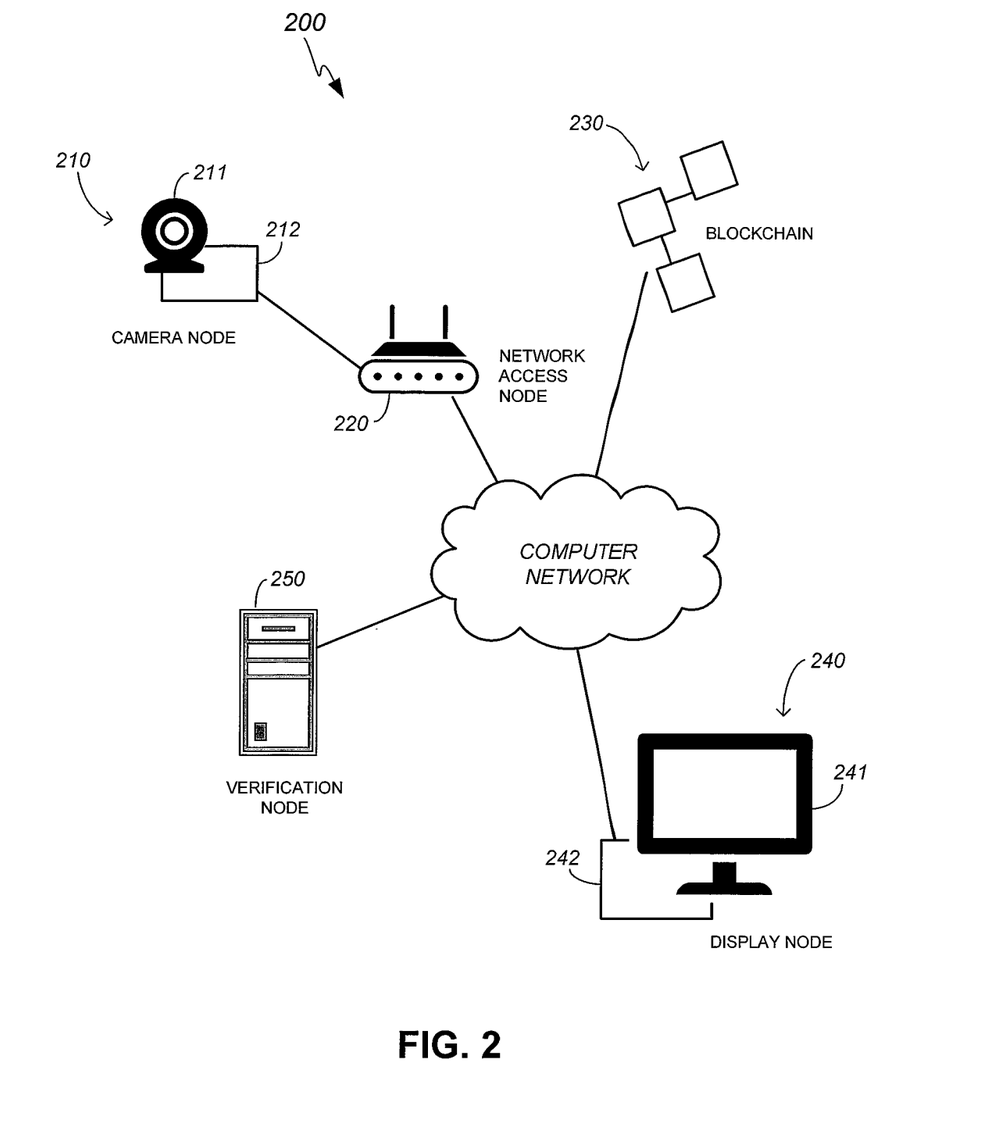
FIG. 2 is a logical diagram of a system for secure transmission of video content in accordance with an embodiment of the present invention.

FIG. 2 is a logical diagram of a system 200 for secure transmission of video content in accordance with an embodiment of the present invention. In the example of FIG. 2, the system 200 includes a camera node 210, a network access node 220, a display node 240, a verification node 250, and a blockchain 230. The aforementioned components of the system 200 may communicate over a computer network that includes the Internet.

In one embodiment, the camera node 210 comprises a video camera 211 and a computer 212, which controls the operation of the video camera 211. As can be appreciated, the computer 212 may be integrated with or external to the video camera 211. The computer 212 may comprise a video camera interface for communicating with the video camera 212, a network interface for communicating with the wireless network node 220, and software modules for providing the functionalities of the camera node 210 as further described below.

The camera node 210 may be configured to record a video of a subject (i.e., a person or thing being video recorded) to generate video content, generate metadata of the video recording, store the video recording metadata in the blockchain 230, generate video data that includes the video content and video recording metadata, and transmit the video data over a computer network by way of the network access node 220. The camera node 210 may be assigned an identifier for identifying the camera node 210 among a plurality of nodes in the system 200. The identifier of the camera node 210 may be a predetermined identifier assigned by an administrator, a Media Access Control (MAC) address, or other identifier.

The camera node 210 may include a secure device fingerprint that uniquely identifies a hardware component of the camera node 210. In one embodiment, the device fingerprint of the camera node 210 is an integrated circuit (IC) fingerprint that is embedded in the video camera 210 or the computer 212. The IC fingerprint may be a so-called physical unclonable function (PUF) for uniquely identifying semiconductor devices, such as microprocessors and other integrated circuits. Unlike a typical identifier, an IC fingerprint is secure and cannot be easily replicated. The IC fingerprint of the camera node 210 may be used in the generation of a public key and a private key, as in public-key cryptography, of the camera node 210.

The network access node 220 may comprise a network device, such as a wireless access point router, that is configured to provide network access by WIFI or other wireless network technology. In one embodiment, the network access node 220 is in the same physical location as the camera node 210, e.g., in the vicinity of the camera node 210. This allows a location proof of the network access node 220 to be used as a location proof of the camera node 210. The network access node 220 is configured to transmit video content and associated recording metadata generated by the camera node 210. In one embodiment, the network access node 220 may be configured to stop streaming of the video content in response to a command or alert from the verification node 250.

Similar to the camera node 210, the network access node 220 may include an embedded IC fingerprint, such as a physical unclonable function. The IC fingerprint of the network access node 220 may be used in the generation of a public key and a private key, as in public-key cryptography, of the network access node 220. The network access node 220 may be assigned an identifier for identifying the network access node 220 among a plurality of nodes in the system 200. The identifier of the network access node 220 may be a predetermined identifier assigned by an administrator, a Media Access Control (MAC) address, or other identifier.

In one embodiment, the display node 240 comprises a display 241 (e.g., computer monitor or video monitor) and a computer 242, which controls the operation of the display 241. The computer 242 may be integrated with or external to the display 241. The computer 242 may comprise a display interface for displaying video content on the display 241, a network interface for communicating over a computer network, and software modules for performing the functionalities of the display node 240. The display node 240 may be configured to receive video data containing the video content, verify the video content, and display the video content when the video content passes verification. In one embodiment, the display node 240 may be configured to stop displaying the video content when the video content fails verification or when the display node 240 receives a command or alert from the verification node 250 to stop displaying the video content.

The verification node 250 may comprise a computer and corresponding software modules for performing the functionalities of the verification node 250. In one embodiment, the verification node 250 is configured to receive, separately from the display node 240, the video data containing the video content and to verify the video content. When the video content fails verification, the verification node 250 may be configured to command or alert the network access node 220 to stop streaming the video content (including any video data containing the video content) and to command or alert the display node 240 to stop displaying the video content.

A distributed ledger in the form of the blockchain 230 may comprise a conventional blockchain infrastructure for storing data. In one embodiment, the blockchain 230 is configured to store recording metadata, a public key of the camera node 210, a public key of the network access node 220, and a location proof. As can be appreciated, instead of a blockchain, other suitable distributed ledger technology (DLT) may also be used, such as the Hashgraph distributed ledger, Iota distributed ledger, DAG distributed ledger etc.

Figure 3:
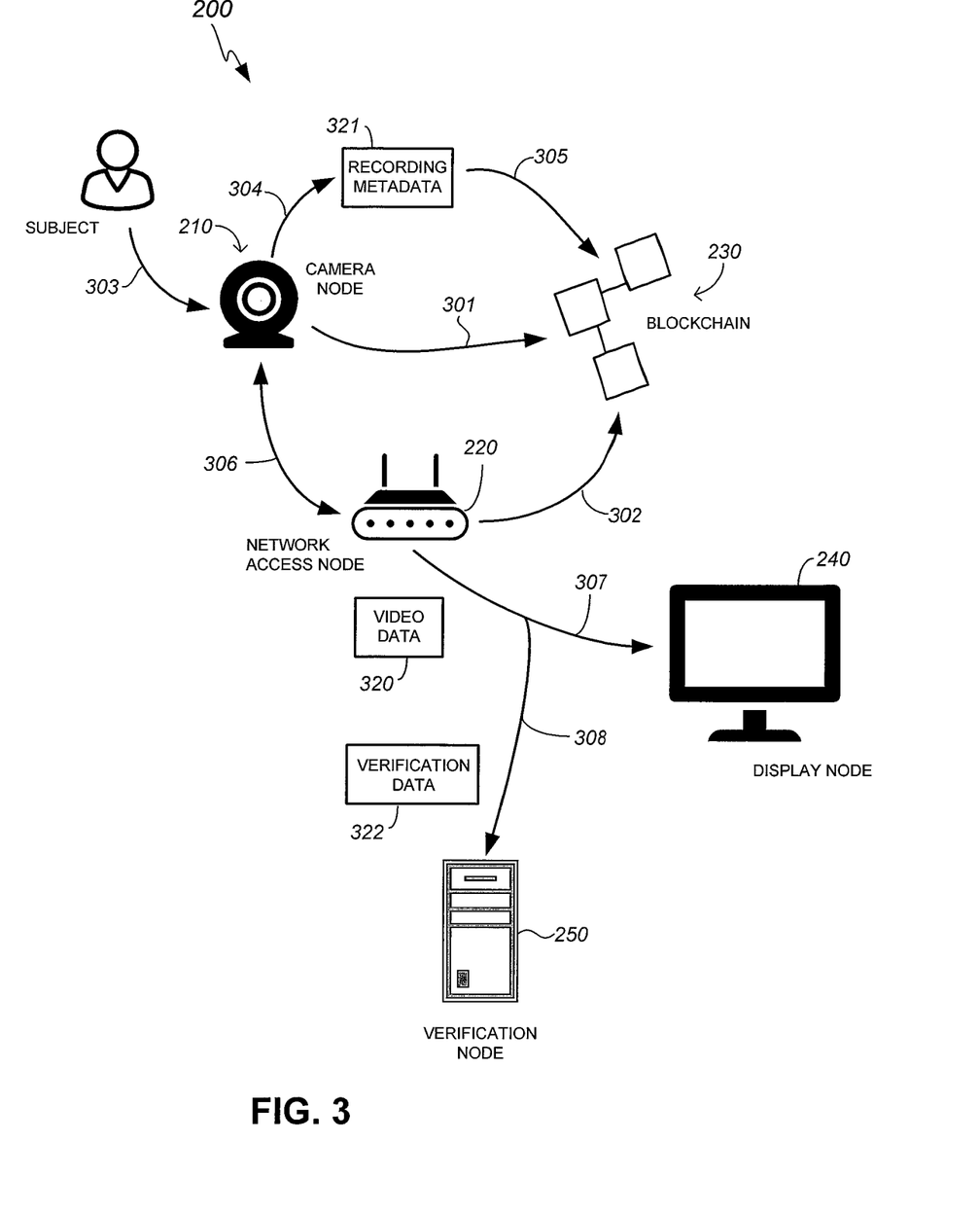
FIG. 3 is a flow diagram of operations performed by the system of FIG. 2 to send video data in accordance with an embodiment of the present invention.

FIG. 3 is a flow diagram of operations performed by the system 200 to send video data in accordance with an embodiment of the present invention. In the example of FIG. 3, the camera node 210 generates a public key and a private key using its device fingerprint, and stores the public key in the blockchain 230 (see arrow 301). Similarly, the network access node 220 generates a public key and a private key using its device fingerprint, and stores the public key in the blockchain 230 (see arrow 302).

The camera node 210 records a video of a subject (e.g., person or thing) to generate video content (see arrow 303). The camera node 210 calculates a hash of the video content and digitally signs the video content using the private key of the camera node 210. The camera node 210 generates metadata 321 of the recording (see arrow 304) and stores the metadata 321 in the blockchain 230 (see arrow 305). The metadata 321 may include a hash of the video content, an identifier of the camera node 210, and time of the recording of the video content.

The camera node 210 may negotiate with the network access node 220 to receive a location proof and the identifier of the network access node 220 (see arrow 306). The camera node 210 may digitally sign the location proof using its private key and transmit the signed location proof to the network access node 220. The network access node 220 also digitally signs the signed location proof, with its private key, and stores the double signed location proof (i.e., signed by the camera node 210 and by the network access node 220) in the blockchain 230. During the initial handshaking with the network access node 220, the camera node 210 may also provide its public key to the network access node 220. The network access node 220 may provide its public key and the public key of the camera node 210 to the verification node 250. As will be more apparent below, this allows the verification node 250 to have the public keys of the network access node 220 and the camera node 210 without necessarily having to access the public keys from the blockchain 230.

A location proof provides evidence of the physical location of the camera node 210 at the time of the recording of the video content. Because the camera node 210 is located in the same general physical location as the network access node 220, a location proof of the network access node 220 may be used to prove the physical location of the camera node 210 at the time of the recording of the video content.

In one embodiment, the network access node 220 is a WIFI wireless access point. In that embodiment, the network access node 220 generates a location proof that is based on wireless characteristics and interactions with the network access node 220. Examples of suitable techniques for generating location proofs of wireless devices include Chitra Javali et al., *Poster: Were You in the Café Yesterday? Location Proof Generation & Verification for Mobile Users*, Proceedings of the 13th ACM Conference on Embedded Networked Sensor Systems, pp. 429-430 (2015) and Chitra Javali et al., *I am Alice, I Was in Wonderland: Secure Location Proof Generation and Verification Protocol*, 2016 IEEE 41st Conference on Local Computer Networks, pp. 477-484 (2016).

In one embodiment, the network access node 220 returns a location proof in the form:

{m, SHA2(locn_tag, m)} where, m is a message and SHA2(locn_tag, m) is an SHA2 hash of a location tag and the message m. Secure hash functions other than the SHA2 hash function may also be employed. The message m may be a concatenation, such as Vault||Nonce||Camera_ID||Wifi_ID where "||" is the concatenation operator, "Vault" is a mathematical computation based on polynomial projects and random points, "Nonce" is an arbitrary random (or pseudo random number), "Camera_ID" is the identifier of the camera node 210, and Wifi_ID is the identifier of the network access node 220.

The location tag employed in the hash calculation (i.e., "Locn_tag") may be calculated by looking at the WIFI characteristics of the channel state information (CSI) between the camera node 210 and the network access node 220. The network access node 220 may select a random set of subcarriers of the signal stream and detect the maximum and minimum of the signal in a specific window size. The set of maximum/minimum points are denoted as "set A". This process is repeated until an appropriate polynomial is constructed, and the location tag is the coefficients of this polynomial.

The network access node 220 may transmit the following message to the blockchain 230 and the verification node 250 as a location proof:

B||Camera_ID||Wifi_ID||Timestamp where "||" is the concatenation operator, "B" is a set constructed mathematically from set A above (subject to constraints), "Camera_ID" is the identifier of the camera node 210, Wifi_ID is the identifier of the network access node 220, and "Timestamp" is the timestamp of the camera node 210 or the network access node 220. The verification node 250 and the display node 240, may verify the location proof by, (a) calculating locn_tag2=Lagrangian interpolation of Vault; and (b) comparing SHA2(locn_tag, m) with SHA2(locn_tag2, m)

If the hash functions SHA2(locn_tag, m) and SHA2(locn_tag2, m) are equal, then the location proof has been verified. Otherwise, when the hash functions are not equal, the location verification fails, and the location proof cannot be trusted.

As can be appreciated, the algorithm employed to generate and verify a location proof depends on the particulars of the security application. For example, the FOAM protocol (<<<https://blog.foam.space/>>>) and Platin protocol (<<<https://platin.io/>>>) may also be used to generate and verify location proofs. Other location proof generation and verification algorithms may also be employed without detracting from the merits of the present invention.

Continuing the example of FIG. 3, the camera node 210 forwards, to the network access node 220, the video content, hash of the video content, an identifier of the camera node 210, and time of recording of the video content. The network access node 220 generates video data 320, which comprises the double signed location proof, the hash of the video content, the identifier of the camera node 210, and the time of recording of the video content.

The network access node 220 forwards the video data 320 to the display node 240 (see arrow 307) and to the verification node 250 (see arrow 308). Thereafter, the video content included in the video data 320 will be verified at the display node 240 and at the verification node 250. Verifying the video content at the verification node 250 and the display node 240, among many advantages, eliminates a single point of verification failure.

The display node 240 may obtain verification data, such as location proofs, public keys, and hashes of video contents, from the blockchain 230 to verify the video content included in the video data 320. However, there may be significant delay in accessing verification data from the blockchain 230, due to the way data are stored and accessed from blockchains in general. Although suitable for some video applications, relying solely on the blockchain 230 to obtain verification data may be too slow. For example, video chat applications may require much faster verification time than what a blockchain architecture can provide.

In one embodiment, the verification node 250 receives, from the network access node 220, verification data 322 associated with the video content. The verification data 322 may comprise a location proof, public key of the camera node 210, public key of the network access node 220, hash of the video content, and time of recording of the video content. The verification data 322 and the video data 320 are sent separately by the network access node 220. More particularly, the network access node 220 may provide the verification node 250 the double signed location proof, public key of the camera node 210, and public key of the network access node 220. This way, the verification node 250 does not necessarily have to access the blockchain 230 to verify the video content that is included in the video data 320.

Figure 4:
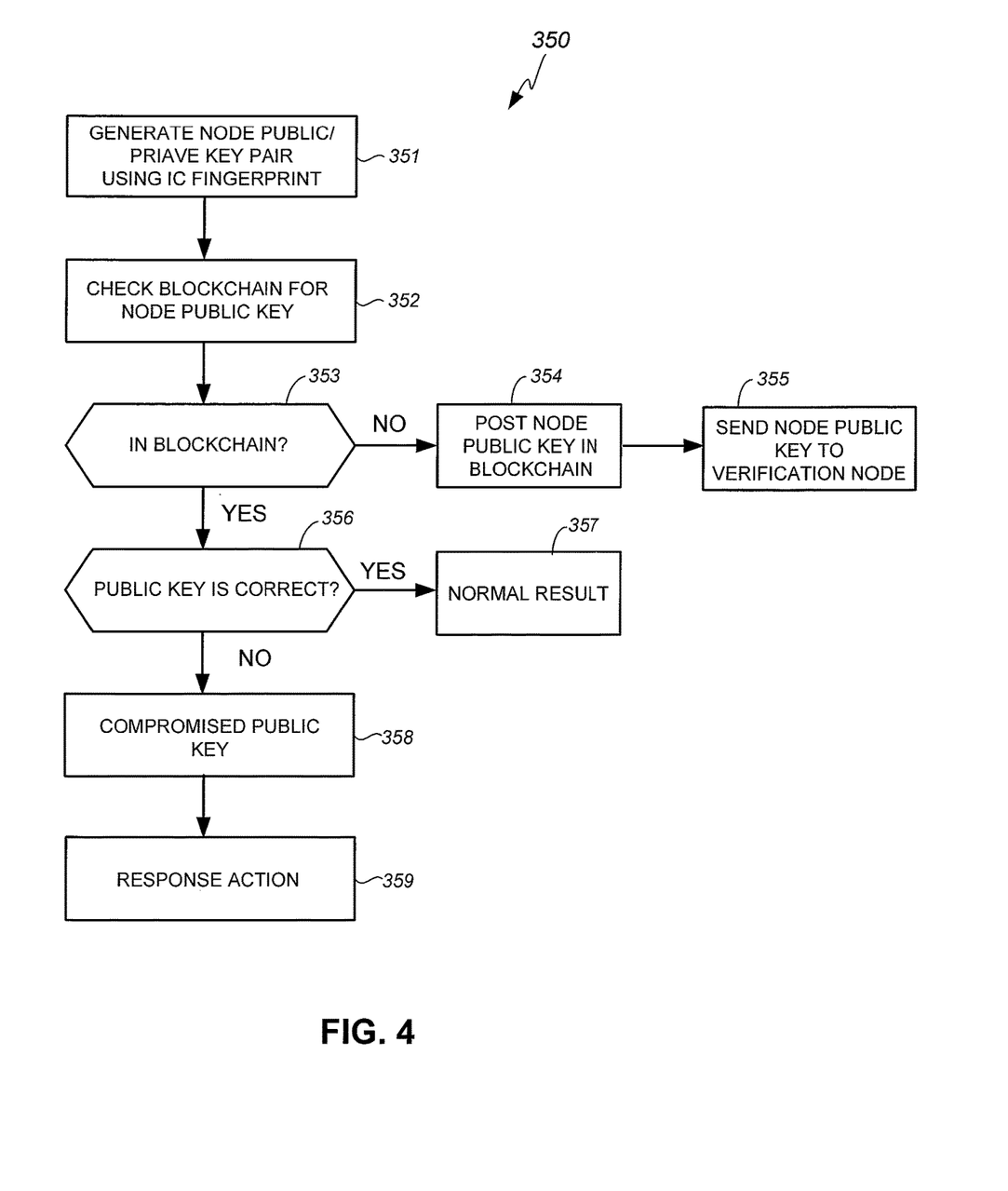
FIG. 4 is a flow diagram of a computer-implemented method of generating digital signing keys in accordance with an embodiment of the present invention.

FIG. 4 is a flow diagram of a computer-implemented method 350 of generating digital signing keys in accordance with an embodiment of the present invention. In one embodiment, the method 350 is performed by the camera node 210 and the network access node 220 to generate a private key/public key pair. The camera node 210 and the network access node 220 are also referred to herein as a "front node"; the display node 240 and the verification node 250 are also referred to herein as an "end node."

In the example of FIG. 4, a front node (i.e., camera node 210 or network access node 220) generates a private key/public key pair using its IC fingerprint (step 351). For example, the IC fingerprint may be used as a seed in the algorithm used to generate a private key and a corresponding public key. The front node then checks the blockchain 230 to determine if the public key generated using the IC fingerprint is already stored in the blockchain 230 (step 352). If the public key is not in the blockchain 230, the front node stores the public key in the blockchain 230 (step 353 to step 354). The public key is also forwarded to the verification node 250 (step 355), so that the verification node 250 does not necessarily have to retrieve the public key from the blockchain 230.

If the public key is already stored in the blockchain 230, the front node retrieves the public key from the blockchain and checks if the retrieved public key is correct (step 353 to step 356). The front node may compare the public key retrieved from the blockchain 230 to the public key generated by the front node (at step 351) to determine if the public key stored in the blockchain 230 is correct. If the public key stored in the blockchain 230 is correct, e.g., the public key retrieved from the blockchain 230 matches the public key generated by the front node, the public key already stored in the blockchain 230 can be trusted, indicating a normal result (step 356 to step 357). Otherwise, if the retrieved public key is incorrect, the public key stored in the blockchain 230 is deemed to be compromised (step 356 to step 358). In that case, the node may perform a response action (step 359), such as alerting an administrator of the system 200, recording an alert in a log, etc.

Figure 5:
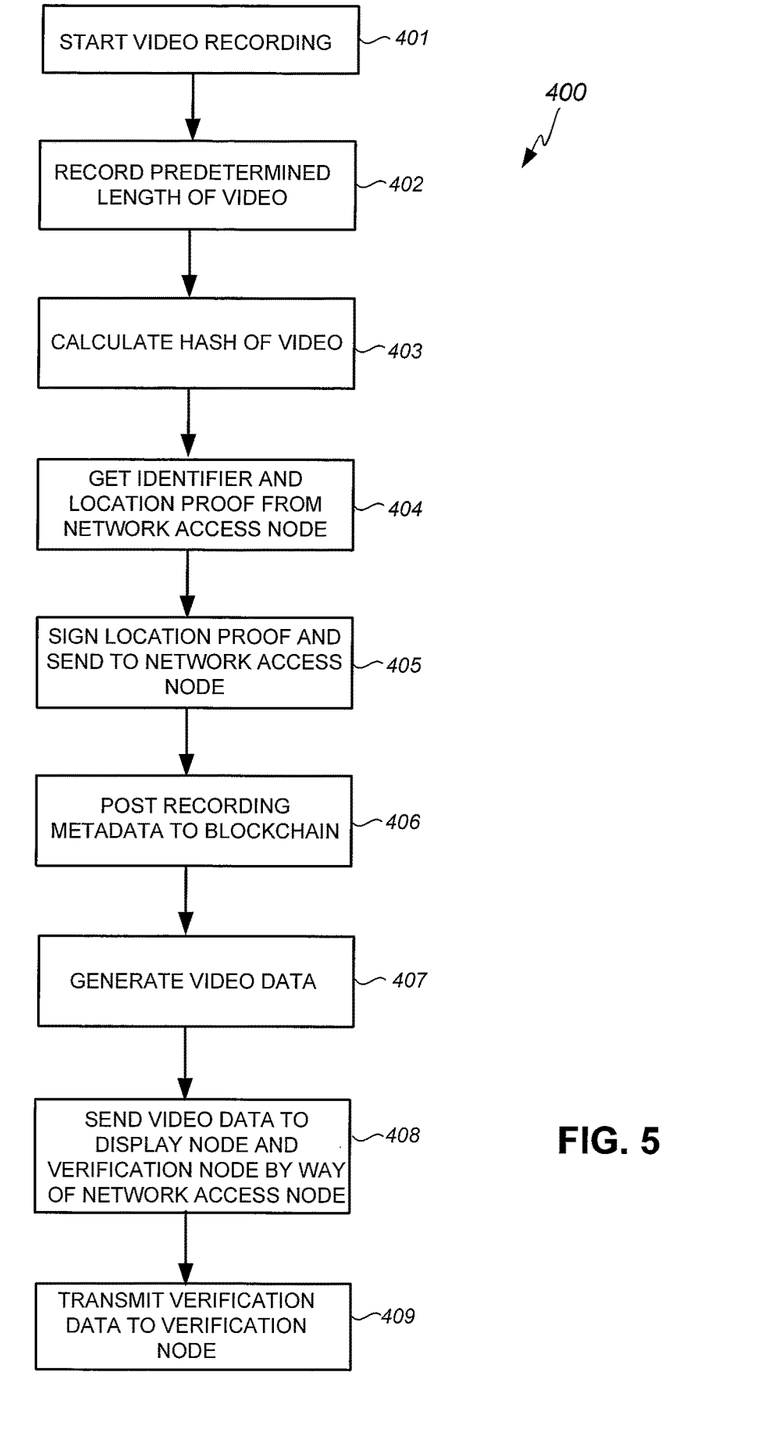
FIG. 5 is a flow diagram of a computer-implemented method of generating and transmitting video content in accordance with an embodiment of the present invention.

FIG. 5 is a flow diagram of a computer-implemented method 400 of generating and transmitting video content in accordance with an embodiment of the present invention. In one embodiment, the method 400 is performed by the camera node 210 in conjunction with the network access node 220 to send video data containing the video content to the display node 240 and the verification node 250.

In the example of FIG. 5, the camera node 210 generates video content by recording a subject (step 401). The camera node 210 may record a predetermined length of video content, such as 1 minute or 10 minutes, etc. (step 402). The recorded video content may be a chunk or segment of video that may be used for verification. In a video chat application, the video content may be sent and verified while the rest of the video chat continues and is streamed to the display node 240. In a fixed length-video application, the entire length of the video may be recorded and verified as a whole.

The camera node 210 calculates a hash of the video content (step 403). The camera node 210 requests the network access node 220 for a location proof and an identifier of the network access node 220 (step 404). The camera node 210 receives, from the network access node 220, the location proof and the identifier of the network access node 220, signs the location proof using the private key of the camera node 210, and forwards the signed location proof to the network access node 220 (step 405). The camera node 210 stores the recording metadata 321 of the video content in the blockchain 230 (step 406). The recording metadata 321 may include a hash of the video content, an identifier of the camera node 210, and time of recording of the video content. The camera node 210 generates video data 320 (step 407), which comprises the video content, the hash of the video content, the identifier of the camera node 210, and time of recording of the video content. The camera node 210 forwards the video data 320 to the network access node 220.

The network access node 220 signs the location proof signed by the camera node 210, adds the double signed location proof to the video data 320 as part of the recording metadata of the video content, and forwards the video data 320 to the display node 240 and to the verification node 250 (step 408). The network access node 220 also forwards the verification data 322 to the verification node 250 (step 409). The verification data 322 may comprise the double signed location proof, public key of the camera node 210, public key of the network access node 220, hash of the video content, and time of recording of the video content.

Figure 6:
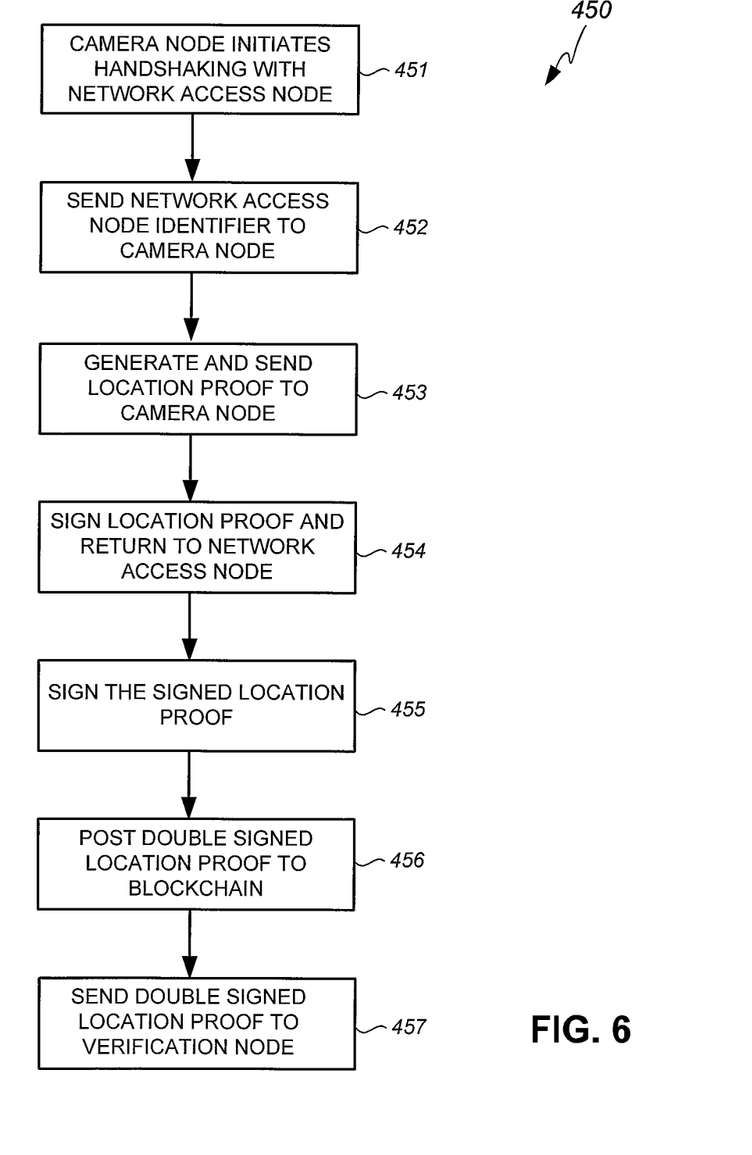
FIG. 6 is a flow diagram of a computer-implemented method of initial handshaking between a camera node and a network access node in accordance with an embodiment of the present invention.

FIG. 6 is a flow diagram of a computer-implemented method 450 of initial handshaking between the camera node 210 and the network access node 220 in accordance with an embodiment of the present invention.

In the example of FIG. 6, the camera node 210 initiates handshaking with the network access node 220 (step 451). In one embodiment, the handshaking includes requesting for a location proof and an identifier from the network access node 220. In response to the handshaking initiated by the camera node 210, the network access node 220 forwards its identifier to the camera node 210 (step 452). The network access node 220 generates and forwards a location proof to the camera node 210 (step 453). As previously noted, the location proof identifies the network access node 220, which is in the vicinity of the camera node 210. The camera node 210 signs the location proof and returns the signed location proof back to the network access node 220 (step 454). The network access node 220 signs the signed location proof (step 455) and stores the now double signed location proof in the blockchain 230 (step 456). The network access node 220 also forwards the double signed location proof to the verification node 250 (step 457), e.g., as part of the verification data 322.

Figure 7:
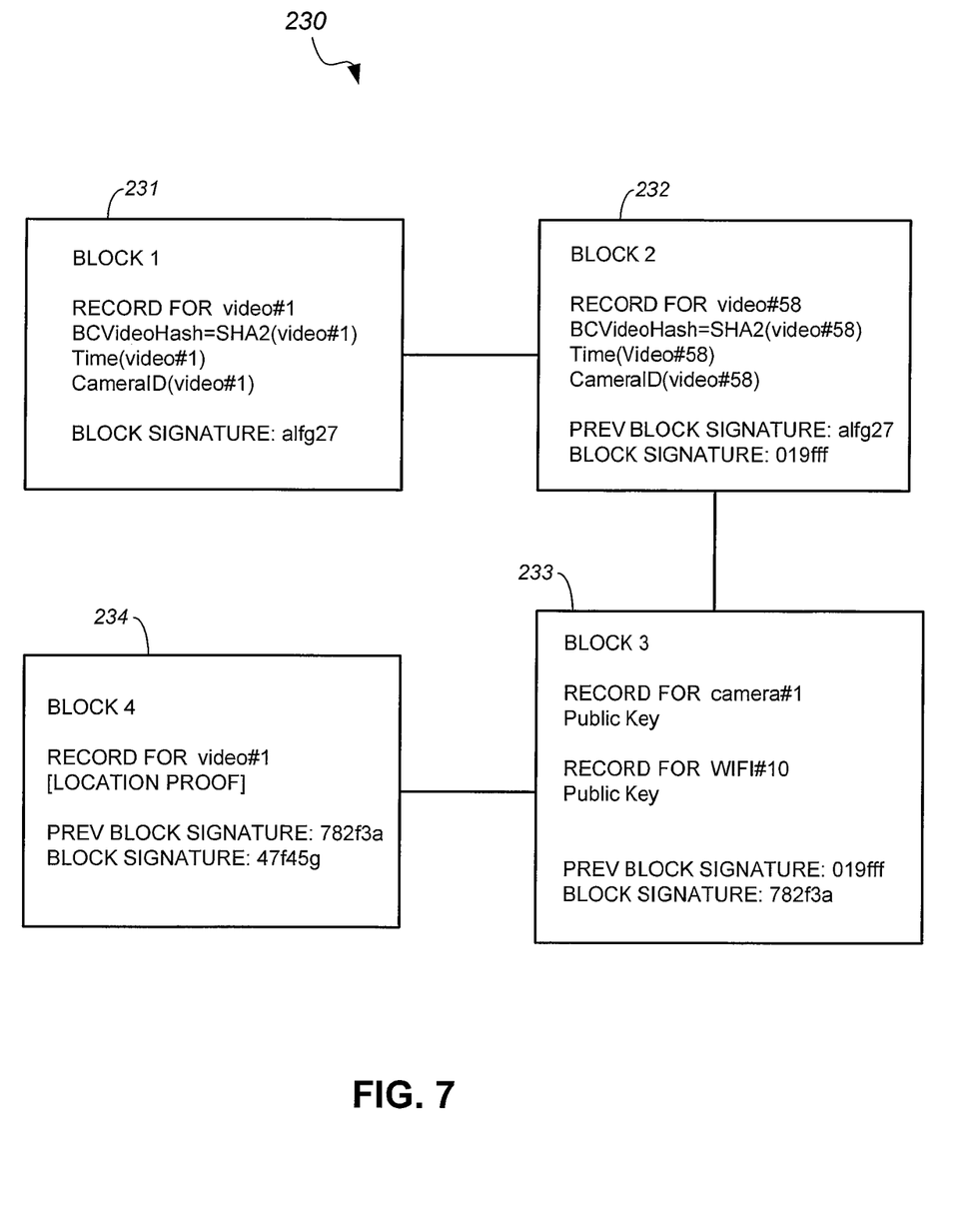
FIG. 7 is a logical diagram of a blockchain in accordance with an embodiment of the present invention.

FIG. 7 is a logical diagram of the blockchain 230 in accordance with an embodiment of the present invention. In the example of FIG. 7, the blockchain 230 comprises chained blocks 231-234 (i.e., BLOCK 1, BLOCK 2, BLOCK 3, BLOCK 4). Block 231 stores recording metadata for a first video content ("video #1") and block 232 stores recording metadata for a second video content ("video #58"). More particularly, block 231 stores the hash of the first video content ("BCVideoHash=SHA2(video #1"), the time of recording of the first video content ("Time(Video #1"), and the identifier of the camera node 210 that was used to record the first video content ("CameraID(video #1)"). Block 232 stores the same information for the second video content. Block 233 stores the public key of a camera node 210 with an identifier "camera #1", and the public key of a network access node 220 with an identifier "WIFI #10". Block 234 stores the double signed location proof associated with the first video content ("video #1"). It is to be noted that because block 231 has the record for the first video content, including the time of recording and identifier of the camera node 210, the double signed location proof stored in the block 234 serves as proof of the physical location of the camera node 210 at the time the first video content was recorded. The blocks 231-234 are chained, with each block having a signature ("BLOCK SIGNATURE") and a reference to the signature of the previous block ("PREV BLOCK SIGNATURE"). As can be appreciated, the particular layout and structure of the blockchain 230 depends on the particular blockchain architecture employed.

Figure 8:
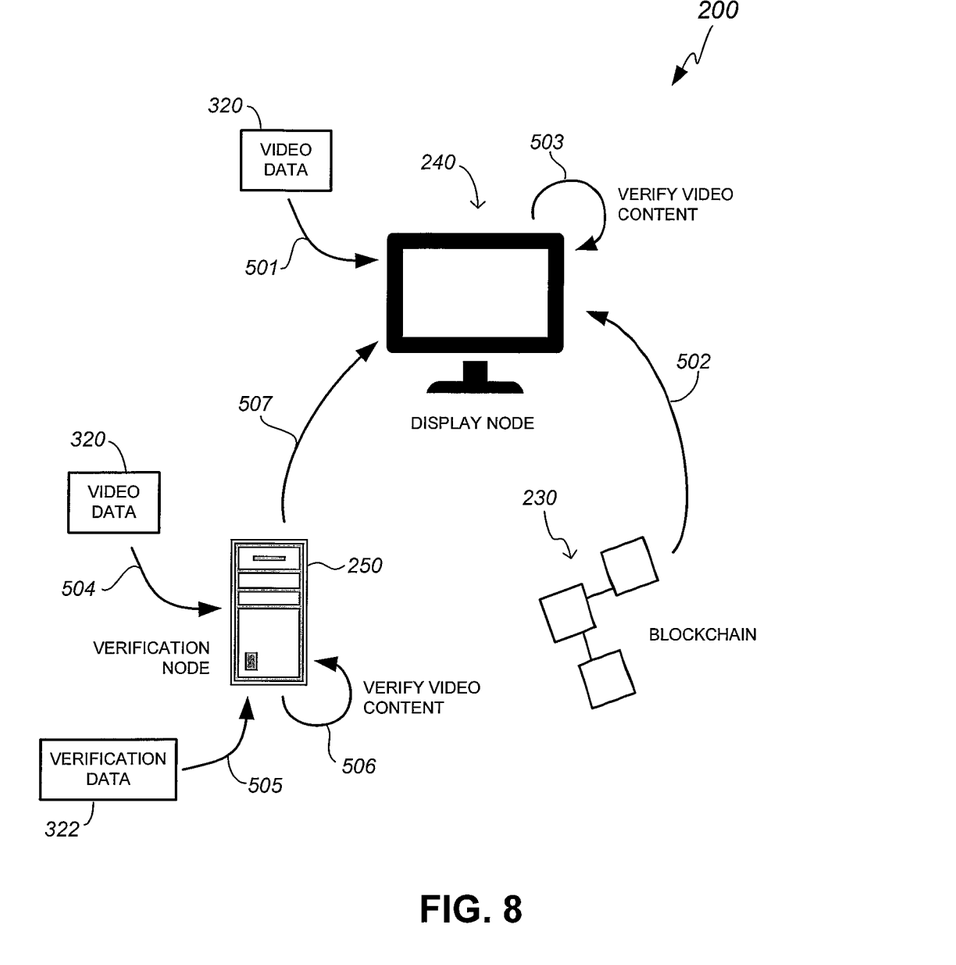
FIG. 8 is a flow diagram of operations performed by the system of FIG. 2 to receive video data in accordance with an embodiment of the present invention.

FIG. 8 is a flow diagram of operations performed by the system 200 to receive video data in accordance with an embodiment of the present invention.

In the example of FIG. 8, the network access node 220 transmits the video data 320 to the display node 240 (see arrow 501). The display node 240 verifies the video content included in the video data 320. As will be more apparent below, in one embodiment, the video content included in the video data 320 is also to be verified by the verification node 250. In one embodiment, the display node 240 and the verification node 250 verify that the video content included in the video data 320 is as recorded by the camera node 210 (i.e., not tampered with) in the same physical location as the network access node 220 at a particular recording time. The verification performed by the display node 240 and the verification node 250 ensures trustworthiness of the video content by detecting tampering of the video content and detecting video (fake or otherwise) not recorded by a purported camera node.

In the example of FIG. 8, the display node 240 retrieves, from the blockchain 230, the hash of the video content, the location proof, the public key of the camera node 210, and the public key of the network access node 220. The public keys of the camera node 210 and the network access node 220 may be used to authenticate retrieved (i.e., from the blockchain 230) data signed by the camera node 210 and the network access node 220. The display node 240 may compare the recording metadata indicated in the video data 320 to retrieved recording metadata to verify the video content (see arrow 503). The display node 240 may display the video content and/or display a success message (e.g., "VIDEO IS AUTHENTIC") when the video content passes verification. Otherwise, in response to the video content failing verification, the display node 240 may stop/block displaying of the video content, alert an administrator (e.g., by email, text message, visual or audible alarm), or perform other response action.

In the example of FIG. 8, the verification node 250 receives the video data 320 (see arrow 504) and corresponding verification data 322 (see arrow 505) from the network access node 220. The verification node 250 then verifies the video content included in the video data 320 (see arrow 506). In one embodiment, the verification node 250 may verify the video content included in the video data 320 by comparing the location proof and hash of the video content included in the verification data 322 to those included in the video data 320. The verification node 250 does not necessarily have to perform any further action when the video content passes verification. When the video content fails verification, the verification node 250 may alert the display node 240 to stop displaying the video content (see arrow 507), alert the network access node 220 to stop transmission of the video data 320 and/or perform other response action to prevent displaying of the video content.

Figure 9A:
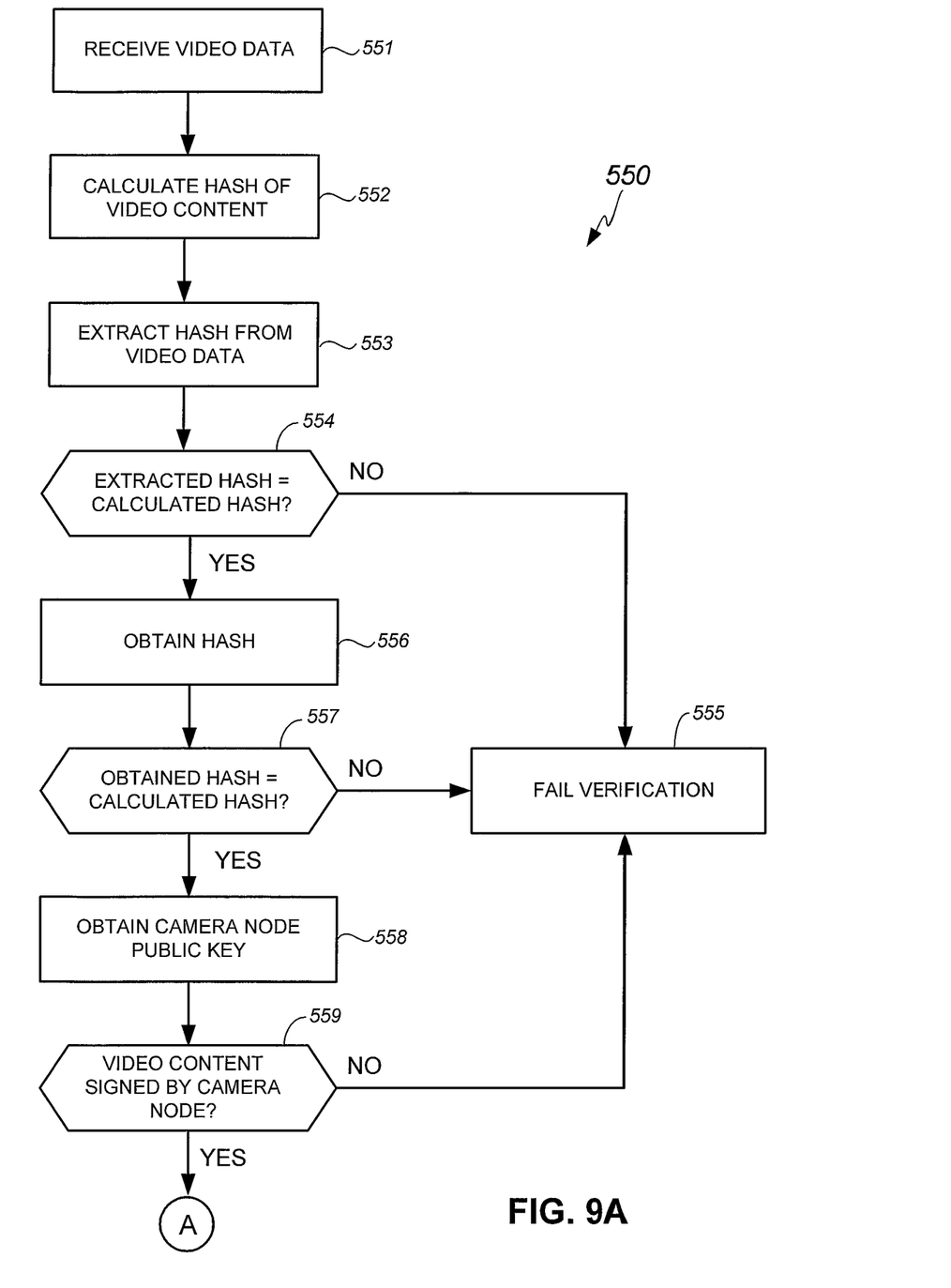
FIGS. 9A and 9B show a flow diagram of a computer-implemented method of verifying video content in accordance with an embodiment of the present invention.
Figure 9B:
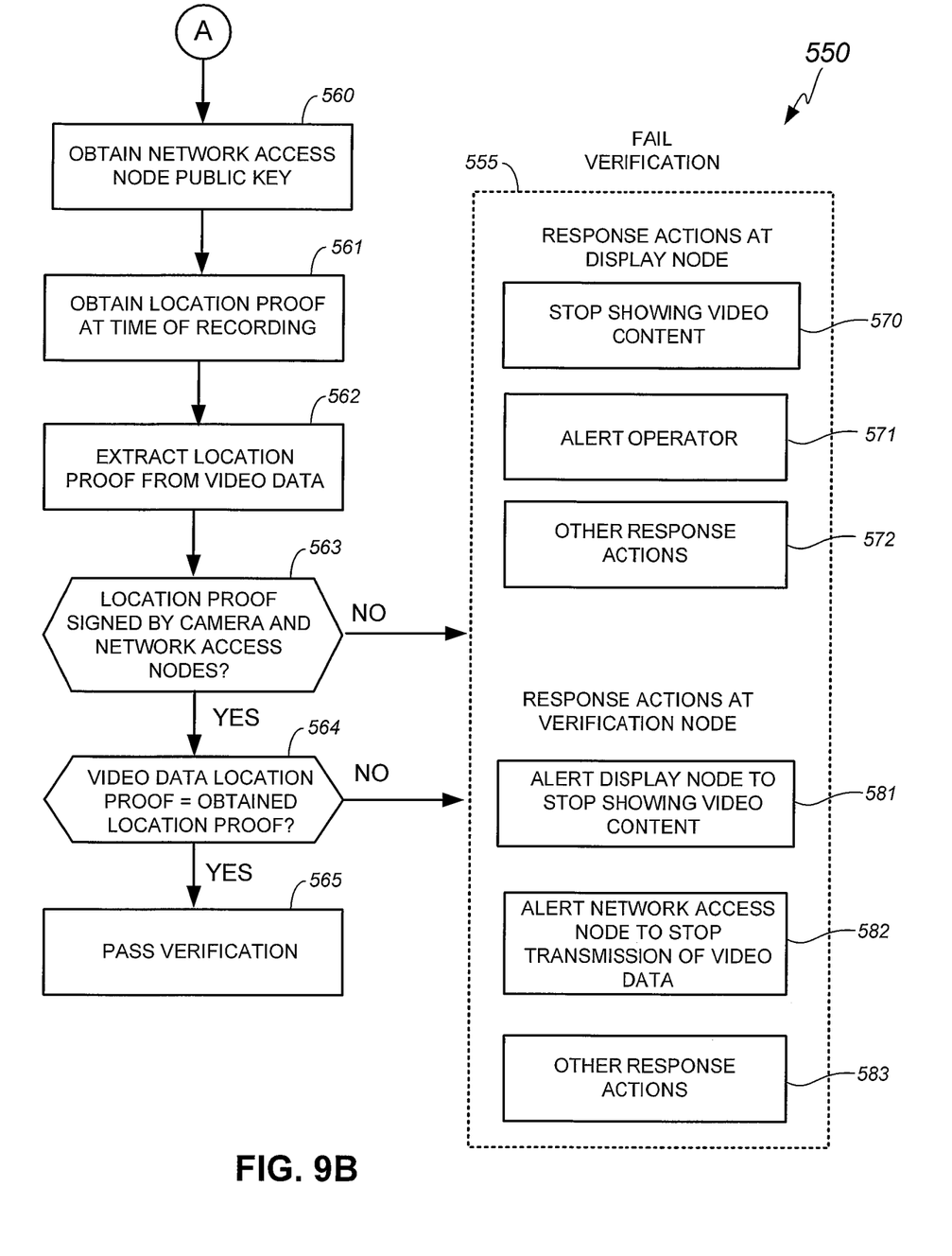

FIGS. 9A and 9B show a flow diagram of a computer-implemented method 550 of verifying video content in accordance with an embodiment of the present invention. The method 550 may be performed by the display node 240 and, separately, by the verification node 250. That is, the display node 240 may perform the method 550 to verify video content, and the verification node 250 may verify the same video content independent of the display node 240. In the following description, an "end node" refers to the display node 240 or the verification node 250. The end node may obtain data for performing verification of the video content either from the blockchain 230 when the end node is the display node 240, or from the verification data 322 when the end node is the verification node 250.

In the example of FIG. 9A, an end node, which may be the display node 240 or the verification node 250, receives the video data 320 (step 551). The end node extracts the video content from the video data 320 and calculates a hash of the video content ("calculated hash") (step 552). The end node also extracts the hash of the video content ("extracted hash") from the video data 320 (i.e., the hash of the video content calculated by the camera node 210) (step 553). The video content is deemed to have failed verification when the hash of the video content calculated by the end node does not match the hash of the video content extracted from the video data 320 (step 554 to step 555). Otherwise (step 554 to step 556), the end node obtains the hash of the video content ("obtained hash") by retrieving the hash of the video content from the blockchain 230 when the end node is the display node 240, or by extracting the hash of the video content from the verification data 322 when the end node is the verification node 250.

The video content is deemed to have failed verification when the hash of the video content obtained by the end node (either from the blockchain 230 or verification data 322) does not match the hash of the video content calculated by the end node (step 557 to step 555). Otherwise (step 557 to step 558), the end node obtains the public key of the camera node 210 by retrieving the public key of the camera node 210 from the blockchain 230 when the end node is the display node 240, or by extracting the public key of the camera node 210 from the verification data 322 when the end node is the verification node 250.

The end node uses the public key of the camera node 210 to determine if the video content was digitally signed by the camera node 210 (step 559). The video content is deemed to have failed verification when the video content was not signed by the camera node 210 (step 559 to step 555). Otherwise (FIG. 9A, step 559 to FIG. 9B, step 560), when the video content was signed by the camera node 210, the end node obtains the public key of the network access node 220.

Continuing to FIG. 9B, the end node obtains the public key of the network access node 220 (step 560) and the location proof at the time of recording of the video content (step 561). As before, the end node may obtain the public key of the network access node 220 and the location proof by retrieving them from the blockchain 230 when the end node is the display node 240, or by extracting them from the verification data 322 when the end node is the verification node 250.

The end node extracts the location proof from the video data 320 (step 562). As previously noted, the location proof in the video data 320 was signed by the camera node 210 and by the network access node 220. The end node uses the obtained public keys of the camera node 210 and the network access node 220 to determine if the location proof included in the video data 320 was signed by the camera node 210 and the network access node 220. The video content is deemed to have failed verification when the location proof included in the video data 320 was not signed by the camera node 210 and by the network access node 220 (step 563 to step 555).

When the location proof included in the video data 320 was signed by the camera node 210 and the network access node 220 (step 563 to step 564), the end node determines if the location proof included in the video data 320 matches the location proof obtained by the end node either from the blockchain 230 when the end node is the display node 240 or from the verification data 322 when the end node is the verification node 250. The video content is deemed to have failed verification when the location proof included in the video data 320 does not match the location proof obtained by the end node (step 564 to 555). Otherwise, the video content is deemed to have passed verification when the location proof included in the video data 320 matches the obtained location proof (step 564 to step 565).

The end node may perform one or more actions in response to the video content failing verification (step 555). When the end node is the display node 240, the display node 240 may stop/block displaying of the video content (step 570), alert an operator of the display node 240 (e.g., by visual or audible alarm) (step 571), and/or perform other response action (step 572) to prevent displaying of the video content. When the end node is the verification node 250, the verification node 250 may alert the display node 240 to stop displaying the video content (step 581), alert the network access node 220 to stop transmission of the video data 320 (step 582), and/or perform other response action (step 583) to prevent displaying of the video content.

Methods and systems for securing video content transmitted over computer networks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of securing video content transmitted over a computer network, the method comprising:
   transmitting, over a computer network, video data from a network device of a network access node to a computer of a display node and to a computer of a verification node, the video data comprising a video content recorded by a video camera of a camera node and a location proof of the network device;
   storing a first hash of the video content and the location proof of the network device in a distributed ledger;
   transmitting, separate from the video data, the location proof of the network device and the first hash of the video content from the network device to the computer of the verification node;
   performing, by the computer of the display node, verification of the video content by comparing a second hash of the video content calculated at the display node to the first hash of the video content stored in the distributed ledger, and by comparing the location proof included in the video data to the location proof stored in the distributed ledger; and
   performing, by the computer of the verification node, verification of the video content by comparing a third hash of the video content calculated at the verification node to the first hash of the video content received by the computer of the verification node from the network device of the network access node, and by comparing the location proof included in the video data to the location proof separately received by the computer of the verification node from the network access node,
   wherein the location proof is digitally signed using a key of the camera node and a key of the network access node.

2. The method of claim 1, wherein the key of the camera node is a private key generated using a device fingerprint of a semiconductor device of the camera node.

3. The method of claim 2, further comprising:
   using, by the computer of the verification node, the public key of the camera node to verify that the location proof included in the video data is digitally signed by the camera node.

4. The method of claim 1, further comprising:
   comparing, by the computer of the verification node, the location proof included in the video data to the location proof separately received by the computer of the verification node from the network access node; and
   comparing, by the computer of the display node, the location proof included in the video data to the location proof stored in the distributed ledger.

5. The method of claim 1, wherein the distributed ledger comprises a blockchain.

6. The method of claim 1, wherein the network access node is a wireless network access point.

7. The method of claim 1, further comprising:
   in response to the video content failing verification at either the verification node or at the display node, preventing displaying of the video content.

8. The method of claim 7, wherein preventing displaying of the video content includes stopping displaying of the video content at the display node.

9. The method of claim 7, wherein preventing displaying of the video content includes stopping transmission of the video data at the network access node.

10. A system for securely transmitting video content over a computer network, the system comprising:
    a camera node having a camera for recording a video content of a subject;
    a network access node having a network access device that is configured to transmit video data comprising the video content and a location proof, the location proof indicating a general location of the camera node;
    a verification node having a computer that is configured to receive the video data, and to verify authenticity of the video content based on a first hash of the video content and the location proof; and
    a display node having a computer and a display for displaying the video content, the display node being configured to verify authenticity of the video content based on a second hash of the video content and the location proof,
    wherein the system is configured to prevent displaying of the video content when the video content fails verification at either the verification node or the display node, and
    wherein the location proof is digitally signed by the camera node and the network access node.

11. The system of claim 10, wherein the system is configured to prevent displaying of the video content by stopping displaying of the video content at the display node.

12. The system of claim 10, wherein the system is configured to prevent displaying of the video content by stopping transmission of the video content from the network access node.

13. The system of claim 10, wherein the camera node is configured to digitally sign the location proof using a private key that is generated using a device fingerprint of a device of the camera node.

14. The system of claim 10, wherein the location proof is a proof of a location of the network access node.

\* \* \* \* \*